United States Patent
Nobutani

(10) Patent No.: US 9,266,356 B2
(45) Date of Patent: Feb. 23, 2016

(54) SPEECH OUTPUT DEVICE, CONTROL METHOD FOR A SPEECH OUTPUT DEVICE, PRINTING DEVICE, AND INTERFACE BOARD

(75) Inventor: Tsutomu Nobutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 927 days.

(21) Appl. No.: 13/048,319

(22) Filed: Mar. 15, 2011

(65) Prior Publication Data
US 2011/0238421 A1    Sep. 29, 2011

(30) Foreign Application Priority Data
Mar. 23, 2010 (JP) .................. 2010-065823

(51) Int. Cl.
*G10L 13/00* (2006.01)
*G06F 17/28* (2006.01)
*B41J 3/44* (2006.01)
*G10L 13/08* (2013.01)
*G10L 15/26* (2006.01)

(52) U.S. Cl.
CPC . *B41J 3/44* (2013.01); *G10L 13/00* (2013.01); *G10L 13/08* (2013.01); *G10L 15/26* (2013.01)

(58) Field of Classification Search
CPC ....... G01C 21/3629; A63F 9/24; G10L 13/00; G10L 13/02; G10L 13/027; G10L 13/04; G10L 13/043; G10L 13/08; G10L 13/086; G10L 2013/00; G10L 2013/02; G10L 2013/08; G06F 17/28; G06F 17/2809; G06F 17/289; G06F 17/30
USPC .......................... 704/2–9, 258, 260, 270, 275
See application file for complete search history.

(56) References Cited

U.S. PATENT DOCUMENTS

| | | | |
|---|---|---|---|
| 6,418,199 B1* | 7/2002 | Perrone ................. | 379/88.01 |
| 7,254,531 B2* | 8/2007 | Nir ........................ | 704/10 |
| 7,369,998 B2* | 5/2008 | Sarich et al. ............ | 704/277 |
| 7,716,037 B2* | 5/2010 | Precoda et al. ......... | 704/2 |
| 7,991,607 B2* | 8/2011 | Zhang et al. ........... | 704/2 |
| 8,090,402 B1* | 1/2012 | Fujisaki ................. | 455/556.1 |
| 8,121,841 B2* | 2/2012 | Badino et al. .......... | 704/260 |
| 8,515,728 B2* | 8/2013 | Boyd et al. ............. | 704/2 |
| 2003/0014253 A1* | 1/2003 | Walsh ..................... | 704/260 |
| 2003/0120478 A1* | 6/2003 | Palmquist ............... | 704/3 |
| 2003/0200078 A1* | 10/2003 | Luo et al. ............... | 704/2 |
| 2004/0033478 A1* | 2/2004 | Knowles et al. ....... | 434/350 |

(Continued)

FOREIGN PATENT DOCUMENTS

| | | |
|---|---|---|
| CN | 1731509 | 2/2006 |
| CN | 101000537 | 7/2007 |

(Continued)

*Primary Examiner* — Paras D Shah

(57) ABSTRACT

A speech output device, a control method for a speech output device, a printer, and an interface board can improve the productivity of foreign language speaking workers in industries such as retailing and food services. A data communication unit 191 acquires print data. A data interpreter 193 analyzes and converts to text data at least part of the data acquired by the data communication unit 191. A language converter 194 converts the text data to one or more preset languages. A speech synthesizer 195 generates one or more units of synthesized speech data corresponding to the language-converted text data from the language converter 194. A speech data output unit 196 outputs the one or more units of synthesized speech data generated by the speech synthesizer 195 to a headphone 104.

5 Claims, 7 Drawing Sheets

(56) References Cited

U.S. PATENT DOCUMENTS

| | | | |
|---|---|---|---|
| 2004/0210444 A1* | 10/2004 | Arenburg et al. | 704/277 |
| 2005/0197825 A1* | 9/2005 | Hagerman et al. | 704/2 |
| 2007/0088547 A1* | 4/2007 | Freedman | 704/235 |
| 2007/0282664 A1* | 12/2007 | Monster | 705/10 |
| 2008/0077387 A1* | 3/2008 | Ariu | 704/3 |
| 2008/0177528 A1* | 7/2008 | Drewes | 704/2 |
| 2008/0282153 A1* | 11/2008 | Kindeberg et al. | 715/256 |
| 2009/0262382 A1 | 10/2009 | Nobutani | |
| 2010/0228549 A1* | 9/2010 | Herman et al. | 704/260 |
| 2013/0114108 A1 | 5/2013 | Nobutani | |

FOREIGN PATENT DOCUMENTS

| | | |
|---|---|---|
| JP | 03-091893 | 4/1991 |
| JP | 2000-113331 | 4/2000 |
| JP | 2000-172944 | 6/2000 |
| JP | 2001-290872 | 10/2001 |
| JP | 2002-269217 | 9/2002 |
| JP | 2002-312852 | 10/2002 |
| JP | 2004-252612 | 9/2004 |
| JP | 2007-074346 A | 3/2007 |
| JP | 2007-172162 | 7/2007 |
| JP | 2008-226085 | 9/2008 |
| JP | 2009-087278 | 4/2009 |

* cited by examiner

| IDENTIFICATION ADDRESS | LANGUAGE | ~46 |
|---|---|---|
| 1. 1. 1. 1 | ENGLISH | |
| 2. 2. 2. 2 | CHINESE | |
| 3. 3. 3. 3 | ENGLISH | |
| 4. 4. 4. 4 | KOREAN | |

FIG. 3A

| CHANNEL | LANGUAGE |
|---|---|
| 1 ch | ENGLISH |
| 2 ch | CHINESE |
| 3 ch | KOREAN |

SPEECH OUTPUT DEVICE, CONTROL METHOD FOR A SPEECH OUTPUT DEVICE, PRINTING DEVICE, AND INTERFACE BOARD

CROSS REFERENCE TO RELATED APPLICATION(S)

The entire disclosure of Japanese Patent Application No. 2010-065823, filed on Mar. 23, 2010, is expressly incorporated by reference herein.

BACKGROUND

1. Technical Field

The present invention relates to a speech output device that supports employees in a retailer such as a supermarket or other type of store, to a control method for the speech output device, to a printing device, and to an interface board.

2. Related Art

Japanese Unexamined Patent Appl. Pub. JP-A-H03-91893 teaches a POS system that can output the receipts that are issued for each sales transaction in a retail store in multiple languages. The POS system taught in JP-A-H03-91893 stores a product master file containing product information in one language (typically the language of the country in which the POS system is used), and a category master file containing product category information and the name of each category in plural languages, and when a product label is read with a barcode reader during a normal transaction, extracts the product name from the product master file for printing on the receipt. In other words, because product name information is stored in one language in the product master file, the receipt is printed in the customary language of that country. When a foreign language compatibility mode is selected using an input device, the name of the category of the product captured by the barcode reader in the selected foreign language is extracted from the category master file and printed on the receipt. This enables printing receipts in the language of the customer during transactions with tourists and other foreign language speakers, for example.

With the growing internationalization of commerce and industry in recent years, foreigners are employed in a wide range of occupations. The retail industry, including supermarkets, is no exception, and foreign language speakers are increasingly employed as cashiers to operate the cash registers. The greatest problems faced employing foreign language speakers as cashiers are language related. The system taught in JP-A-H03-91893 can issue receipts in a language that can be understood by the customer when the customer cannot read the local language. However, when it comes to POS system operations, particularly cash register operations, the system is compatible with only one language (such as Japanese), and foreign cashiers must operate the cash register using a language other than their own. More specifically, POS system operations often involve special tasks that are not commonly used and remembering all system operations completely is difficult, particularly when the operation must be learned in an unfamiliar foreign language.

Language problems therefore sometimes result in a severe drop in the accuracy of transaction processes (cash register operations) when foreigners are employed to operate the cash registers. Foreigners are also increasingly employed as kitchen workers in fast food restaurants, for example. Kitchen printers are often used to print customer orders for the kitchen workers, but language problems mean that reading the order may take longer, thus slowing down work and resulting in mistakes filling orders due to reading errors. Promptness is particularly important in stores with drive-through windows, creating strong demand for ways to reduce delays and prevent mistakes.

SUMMARY

A speech output device, a control method for a speech output device, a printer, and an interface board according to the invention enable improving the productivity of foreign employees in the retail industry, for example. The invention also improves efficiency by using a language table to use different languages in combination for printing by a kitchen printer, the display language of the cash register display, the language printed by the receipt printer, the speech language used for issuing instructions to kitchen workers, and the speech language used for giving instructions to cashiers.

A first aspect of the invention is a speech output device including: a data acquisition unit that acquires print data; a base language conversion unit that analyzes and converts to base language data at least part of the data acquired by the data acquisition unit; a language conversion unit that converts the base language data to one or more preset languages; a speech synthesis unit that generates one or more units of synthesized speech data corresponding to the base language data converted by the language conversion unit; and a speech output unit that outputs to an external output device the one or more units of synthesized speech data generated by the speech synthesis unit.

Another aspect of the invention is a control method for a speech output device, including: a data acquisition step that acquires print data; a base language conversion step that analyzes and converts to base language data at least part of the data acquired by the data acquisition step; a language conversion step that converts the base language data to one or more preset languages; a speech synthesis step that generates one or more units of synthesized speech data corresponding to the base language data converted by the language conversion step; and a speech output step that outputs to an external output device the one or more units of synthesized speech data generated by the speech synthesis step.

These aspects of the invention enable converting information (such as order content product names, quantities, and process types (cancel, total)) to be printed by printer such as a kitchen printer to a specified language, and outputting the language-converted information as speech. For example, when kitchen workers in a restaurant are foreigners, information to be printed by the kitchen printer is converted to the languages spoken (understood) by the foreign kitchen workers, and outputs as speech to an external output device (such as a head set (headphone)) worn by the foreign kitchen worker). The foreign kitchen workers can thus hear and understand the order content in their own languages. A drop in productivity resulting from a foreign kitchen worker not understanding the language can therefore be prevented.

One example of a data analysis method that could be used by the base language conversion unit includes a word comparison and extraction method that compares data with a registered word table and extracts the matching words.

The speech output device according to another aspect of the invention preferably has more than one external output device, and a language table storage unit that stores a language table relating identification information for each external output device to a language. The speech output unit references the language table and outputs the synthesized speech data to the external output device linked to the language.

With this aspect of the invention synthesized speech data for the language selected by each worker can be output to the external output device used by each worker. As a result, the invention can be deployed in a workplace where there are multiple foreign employees speaking different languages.

A configuration in which a single external output device can be set to plural languages is also conceivable. In this configuration synthesized speech data for the plural languages is preferably output sequentially to the external output devices. As a result, synthesized speech can be output in plural languages for plural foreign workers using a single external output device.

A speech output device according to another aspect of the invention preferably has plural external output devices; and each external output device can set the language corresponding thereto, and outputs audio of the synthesized speech data corresponding to the set language from the one or more units of synthesized speech data output from the speech output unit.

This configuration enables individual employees to set the language output by their own external output device so that speech is output in the preferred language. This enables a single external output device to be used in shifts by plural foreign workers speaking different languages.

In a speech output device according to another aspect of the invention, the print data preferably includes POS terminal output data.

This aspect of the invention acquires and converts the language of output from a POS terminal (such as print data for a sales receipt or print data sent to a kitchen printer), and can output the converted information as speech.

In a speech output device according to another aspect of the invention, the print data includes output from a code reader that reads encoded information.

By reading product codes as the code information, for example, this aspect of the invention enables the employee to get product information for each product as each product is scanned.

In a speech output device according to another aspect of the invention, the speech output unit outputs one or more units of task instruction speech data, which is speech data for task instructions for an operator, in the one or more languages to the external output device.

By outputting speech data for task instructions to the external output device of an employee, this aspect of the invention enables the employee to work based on the instructions, and can thereby reduce mistakes due to operator errors. Examples of speech data for task instructions include what steps to take to process a particular payment method based on payment method information contained in the output from the POS terminal, and instructions corresponding to the timing of print data acquisition.

Furthermore, by outputting the same content in the language understood by the customer after outputting it in the language understood by the operator, the operator can simply mimic and repeat the same words to convey information in a way that can be easily understood by a customer that uses a language not understood by the operator.

In a speech output device according to another aspect of the invention, the speech output unit outputs synthesized speech data to emphasize the volume of at least part of the monetary information contained in the base language data.

This aspect of the invention increases the volume to emphasize money-related parts of the information printed on a receipt (such as the total amount, the amount received, and the change due). This can prompt the foreign operator to pay closer attention to monetary amounts, and thereby reduce mistakes making change, for example.

Another aspect of the invention is a printing device including the parts of the speech output device described above.

Another aspect of the invention is an interface board that can be installed in an electronic device and includes the parts of the speech output device described above.

These aspect of the invention enable providing a printer and an interface board that can be installed in an electronic device to convert information sent to a receipt or kitchen printer, for example, to a specified language, and output the language-converted information as speech.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 is an example of a language table and headphone channel settings.

DESCRIPTION OF EMBODIMENTS

Embodiment 1

A speech output device, a control method for a speech output device, a printer, and an interface board according to the invention are described next. A first embodiment of the invention describes an employee support system SY1 that supports an order content confirmation process for foreign kitchen workers (referred to below as simply kitchen workers) by using an interface board having the functions of a speech output device installed in a kitchen printer 102 used in a fast food restaurant, for example.

Figure 1:
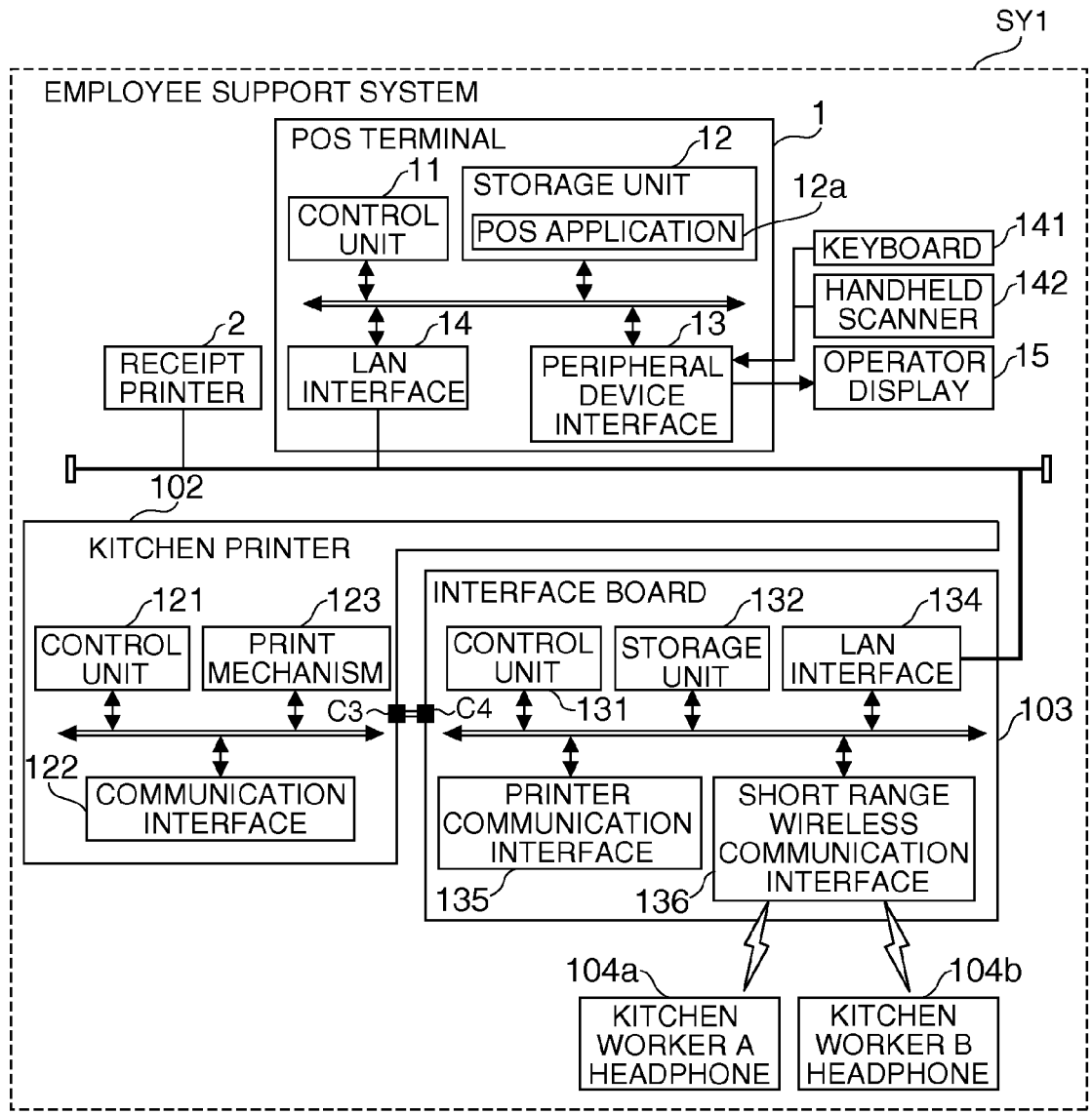
FIG. 1 is a control block diagram of an employee support system according to a preferred embodiment of the invention.

FIG. 1 is a control block diagram showing the configuration of a employee support system SY1 according to the first embodiment of the invention. As shown in the figure, the employee support system SY1 includes a POS terminal 1 that runs a transaction process, a receipt printer 2 that issues sales receipts, a kitchen printer 102 (printing device) that prints an order ticket for relaying order content to kitchen workers, an interface board 103 (interface board, speech output device) that can be removably installed to the kitchen printer 102, and one or more headphones 104 (external output device, two sets shown in the example in the figure) that are worn by the kitchen workers.

The kitchen printer 102 and interface board 103 are connected through connectors C3 and C4. The POS terminal 1, receipt printer 2, and interface board 103 are communicably connected through a LAN 5 (wired or wireless LAN). The headphones 104 communicate with the interface board 103 using short range wireless communication (such as Bluetooth (R)).

The language used by the employee support system SY1 in this embodiment of the invention is the language customarily used in the country or region where the employee support system SY1 is used. For example, if the employee support system SY1 is used in Japan, the customary language is Japanese. This customary language can be freely set and changed according to the country or region, or the specific location or facility (such as an international airport or casino), where the employee support system SY1 is used.

The POS terminal 1 runs a transaction process based on product information entered by the operator, and includes a storage unit 12, peripheral device interface 13, LAN interface 14, and a control unit 11 that controls the POS terminal 1 and is connected to these other devices. The peripheral device interface 13 is for connecting POS peripherals such as a keyboard 141, a handheld scanner 142 (code reader), and an operator display 15. The LAN interface 14 is for communicating through the LAN 5 with the interface board 103 and POS server (not shown in the figure), for example.

The control unit 11 includes a CPU (central processing unit), RAM (random access memory), and ROM (read-only memory) (all not shown in the figures). The CPU controls operation of the POS terminal 1. RAM is used as working memory for processes executed by the CPU. ROM stores the control program and control data for processes executed by the CPU.

The storage unit 12 stores a POS application 12a. The POS application 12a is a program for running a transaction process, and includes a peripheral device control program for controlling the POS peripherals connected to the POS terminal 1.

The control unit 11 acquires the product data for purchased products from the POS server based on input data from the keyboard 141 or handheld scanner 142, that is, acquires product data generated from the product code master (not shown in the figure) stored on the POS server side. The control unit 11 generates transaction data (payment data) in conjunction with the POS application 12a based on the acquired product data. The control unit 11 also generates the receipt print data for printing sales receipts based on the transaction data, and sends the receipt print data to the receipt printer 2. The control unit 11 also generates order print data for printing order tickets based on the acquired product data or transaction data, and sends the order print data to the kitchen printer 102 (more specifically, to the interface board 103 installed in the kitchen printer 102).

The kitchen printer 102 has a communication interface 122, a print mechanism 123, and a control unit 121 that is connected to these and controls kitchen printer 102 operation. The control unit 121 includes a CPU, RAM, and ROM. The CPU controls kitchen printer 102 operation. RAM is used as working memory for processes executed by the CPU. ROM stores the control program and control data for processes executed by the CPU.

The communication interface 122 communicates with the interface board 103 through the connectors C3 and C4, and acquires the order print data from the POS terminal 1 through the interface board 103.

The print mechanism 123 includes a printhead, paper feed mechanism, and ink supply mechanism (all not shown in the figures), and based on the acquired order print data prints an order ticket on receipt paper.

The interface board 103 includes a storage unit 132 (such as flash ROM), LAN interface 134, printer communication interface 135, short range wireless communication interface 136, and control unit 131 that is connected to these other interfaces and controls the interface board 103. The storage unit 132 stores dictionary data for language conversion, and dictionary data for speech synthesis. The language conversion dictionary data is dictionary data for converting words contained in text data to another language. The speech synthesis dictionary data is dictionary data for generating synthesized speech from text data stored in a plurality of languages.

The storage unit 132 stores a language table 46 that relates identification addresses (identification information) for the headphones 104 and the corresponding languages (see FIG. 3A). The language table 46 identifies which language is used with which headphone 104. For example, in the example shown in FIG. 3A, synthesized speech data in English is output to the headphone 104 with identification address 1.1.1.1, and synthesized speech data in Chinese is output to the headphone 104 with identification address 2.2.2.2. As a result, speech in the language appropriate to each employee can be output from each headphone 104 when there are kitchen workers that speak plural different languages in the same workplace. More specifically, English speed is output from the headphone 104a used by kitchen worker A, and Chinese speech is output from the headphone 104b of kitchen worker B, for example. The language table 46 can be changed as needed using an external writing device (not shown in the figure) or the POS terminal 1, for example.

The control unit 131 includes a CPU, RAM, and ROM. The CPU controls operation of the interface board 103. RAM is used as working memory for processes executed by the CPU. ROM stores the control program and control data for processes executed by the CPU. The control program includes a language conversion program and speech synthesis program. The language conversion program is a program that uses the language conversion dictionary data to convert text data written in the customary language to a different specified language (other language). The speech synthesis program uses the speech synthesis dictionary data to generate synthesized speech data corresponding to supplied text data.

The LAN interface 134 communicates with the POS terminal 1 and POS server, for example, through the LAN 5. The printer communication interface 135 communicates with the connected kitchen printer 102 through the connectors C3 and C4. The short range wireless communication interface 136 is used for short range wireless communication with the headphones 104. The control unit 131 acquires order print data from the POS terminal 1 through the LAN interface 134, and sends the order print data through the printer communication interface 135 to the kitchen printer 102. The control unit 131 generates synthesized speech data based on the acquired order print data, and outputs through the short range wireless communication interface 136 to a headphone 104. The control unit 131 refers to the language table 46 described above to determine to which headphone 104 to send the synthesized speech data. Note that wired communication may be used instead of short range wireless communication. A speaker may also be used instead of a headphone 104.

Figure 2:
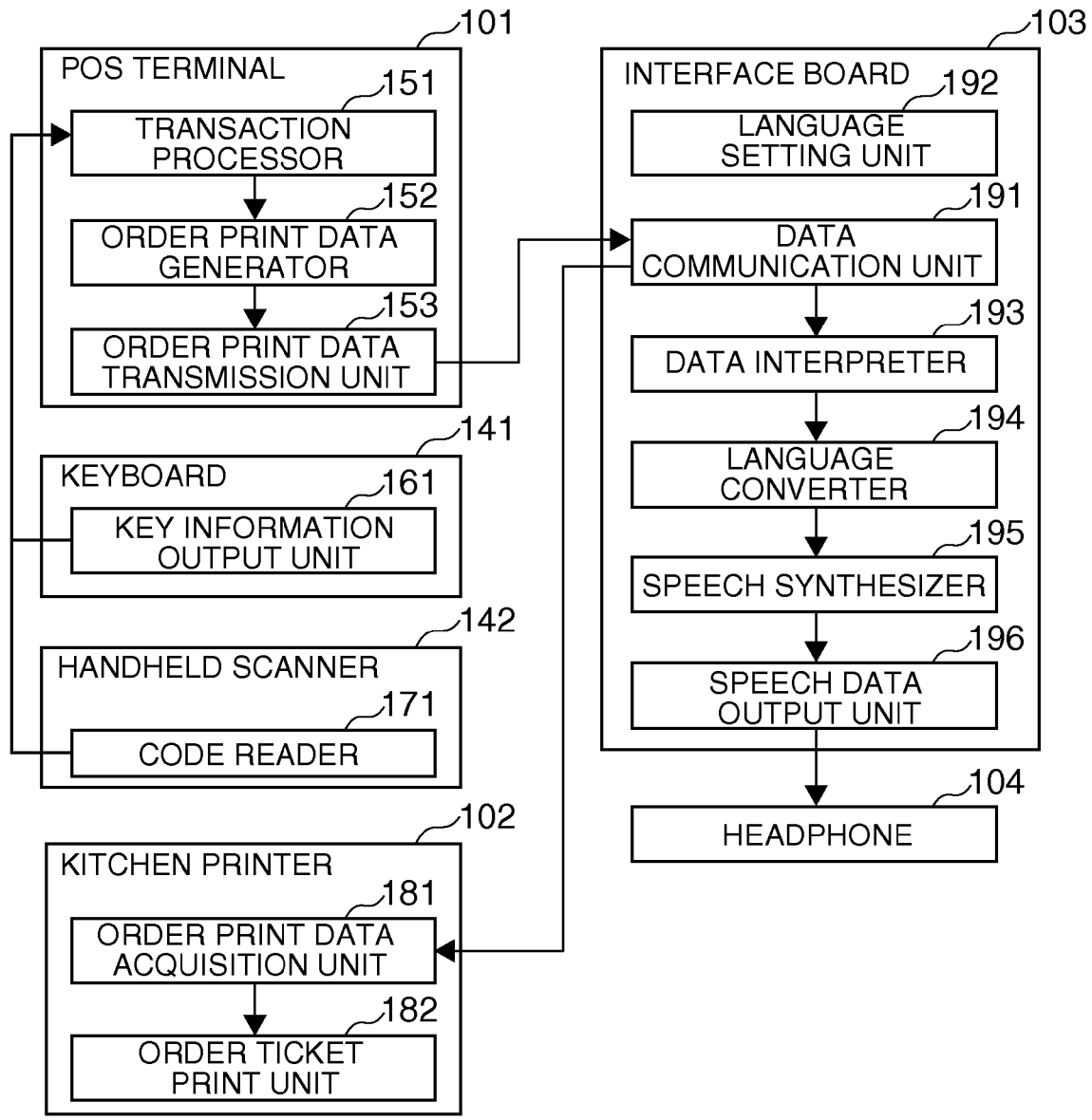
FIG. 2 is a function block diagram of an employee support system according to a first embodiment of the invention.

The functional configuration of the employee support system SY1 is described next with reference to FIG. 2.

The main functional components of the POS terminal 1 include a transaction processor 151, order print data generator 152, and order print data transmission unit 153. The transaction processor 151 is a major component of the POS application 12a, and executes a transaction process based on input data from an input device (such as the keyboard 141 or handheld scanner 142). The order print data generator 152 generates order print data based on the result of the transaction process. The order print data transmission unit 153 sends the resulting order print data to the interface board 103.

The main functional component of the keyboard 141 is a key information output unit 161. The key information output unit 161 outputs key operation information generated when the user operates a key, such as a product key or an exception key, to the transaction processor 151. Exception process keys in this embodiment of the invention include special order keys that are used to enter customer preferences (such as "no pickles" or "no mustard" in a hamburger shop), and a cancel key, for example.

The main functional component of the handheld scanner 142 is a code reader 171. The code reader 171 reads product codes from encoded images such as product barcodes used to identify ordered products and preference barcodes used to identify customer preferences, and outputs the captured result to the transaction processor 151.

The main functional components of the kitchen printer 102 are an order print data acquisition unit 181 and order ticket print unit 182. The order print data acquisition unit 181 acquires the order print data generated by the POS terminal 1 through the interface board 103. The order ticket print unit 182 then prints an order ticket based on the acquired order print data.

The main functional components of the interface board 103 include a data communication unit 191 (data acquisition unit), language setting unit 192, data interpreter 193 (base language conversion unit), language converter 194, speech synthesizer 195, and speech data output unit 196.

The data communication unit 191 receives order print data sent from the POS terminal 1, and sends the received order print data to the kitchen printer 102. This data communication unit 191 is a main component of the LAN interface 134 and printer communication interface 135.

The language setting unit 192 sets one or more languages converted by the language converter 194. The languages are set using an external device or the POS terminal 1, and are set to the languages used by the kitchen workers. The data interpreter 193 analyzes the order print data received by the data communication unit 191, and converts the product name parts and customer preference parts contained in the order print data to the base language data (text data, compressed text data, or index number for retrieving data from a database not shown, for example, referred to below as text data).

The language converter 194 converts the text data output by the data interpreter 193 based on the language conversion dictionary data to the languages set by the language setting unit 192. The speech synthesizer 195 generates one or more units of synthesized speech data from the text data output by the language converter 194 based on the speech synthesis dictionary data.

The speech data output unit 196 outputs the one or more units of synthesized speech data from the speech synthesizer 195 to the corresponding headphones 104 by means of short range wireless communication.

When outputting the speech data, the customer preferences part may be output at a higher volume than the synthesized speech data corresponding to the product name part. Synthesized speech data containing instructions of predefined phrases for the kitchen workers (such as "an order was just received," "cancel the order," or "end of order") may also be output at predetermined times (such as when order print data is received, order cancellation data is received, or an automatic paper cutter command is received) to the headphones 104. More specifically, speech data corresponding to specific events can be output triggered by receiving data other than the data to be printed on the order ticket (order print data), such as when cancellation data is received or an automatic cutter command is received.

Figure 4:
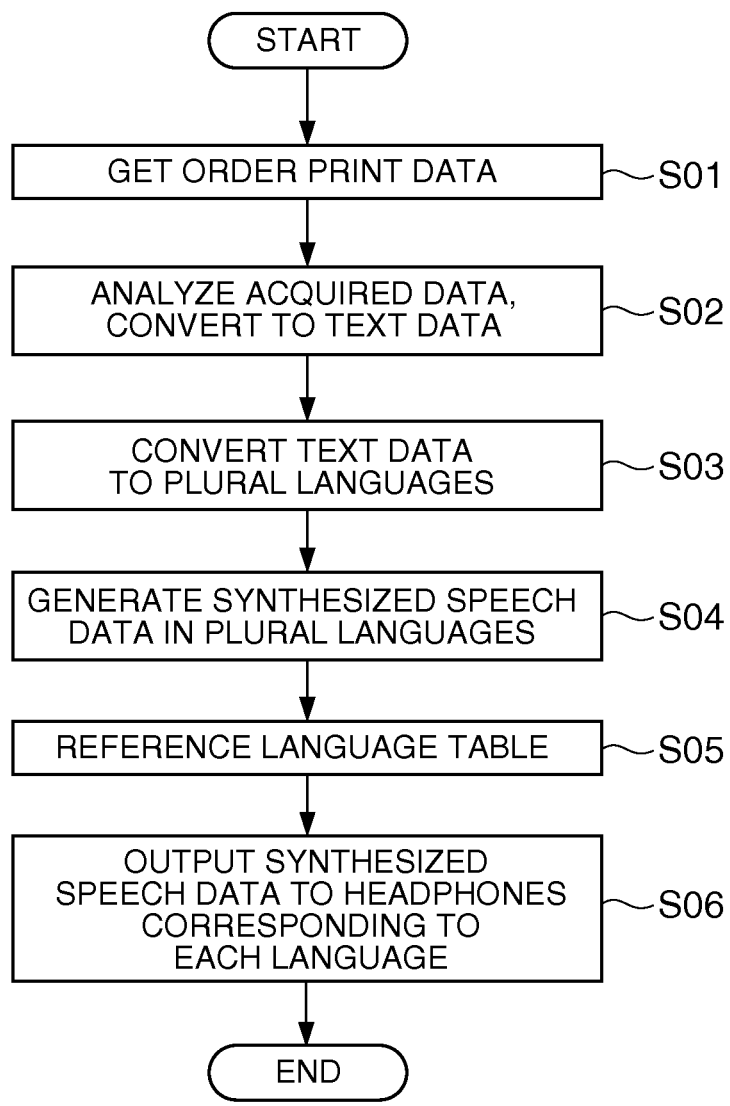
FIG. 4 is a flow chart of the speech output process of the employee support system according to the first embodiment of the invention.

The speech output process of the employee support system SY1 (interface board 103) is described next with reference to the flow chart in FIG. 4. The process described below is premised on a plurality of languages already being configured in the language table 46 (see FIG. 3A).

When order print data is acquired from the POS terminal 1 (S01), the interface board 103 (control unit 131) analyzes the acquired order print data and converts the product name parts and customer preference parts contained in the analyzed data, and data for predetermined times and instructions, to text data (S02). The interface board 103 then converts the converted text data to expressions in the plural languages set in the language table 46 (S03), and converts the language-specific text data to the corresponding synthesized speech data (S04). The interface board 103 then references the language table 46 (S05), and outputs the generated synthesized speech data to the headphones 104 of the corresponding identification address (S06).

As described above, the employee support system SY1 according to this embodiment of the invention can convert information (such as product name or customer preference information) to be printed on a receipt (order ticket) to a preset language, and can output the information in the converted language as speech. As a result, when a kitchen worker is a foreign language speaker, for example, the information printed on the order ticket can be converted to the language spoken (a language understood) by the kitchen worker, and output as speech to a headphone 104 worn by the kitchen worker. As a result, foreign kitchen workers can hear and get the order content in their own language, and mistakes such as preparing an order not as requested by the customer can be reduced.

If a speaker is used instead of headphones 104, speech in the plural languages used by the employees working in the same place could also be sequentially output from the speaker. This enables using a single speaker to provide instructions to plural foreign kitchen workers that speak different languages.

Furthermore, because synthesized speech data is generated and output using order print data output from the POS terminal 1, the invention can be used without changing the POS terminal 1 or POS peripherals.

The interface board 103 in the foregoing embodiment outputs synthesized speech to the headphones 104 of the kitchen workers wearing the headphones based on the language table 46, but a configuration in which the language setting is changed on the headphone 104 side is also conceivable. More specifically, a language selection unit (not shown in the figure) for selecting the desired language could be rendered in each headphone 104 set. As shown in FIG. 3B, this enables outputting English speech when the language selection unit is set to channel 1 (1*ch*), and Chinese speech when set to channel 2 (2*ch*), for example. In this configuration the speech data output unit 96 broadcasts synthesized speech data for all available languages, and synthesized speech in the desired language is selectively received and output on the headphone 104. This configuration enables each employee to set their own headphone 104 to their own language to output speech in their preferred language. As a result, the output language can be easily changed when a single headphone 104 is used by plural kitchen workers speaking different languages in different shifts.

Embodiment 2

Figure 6:
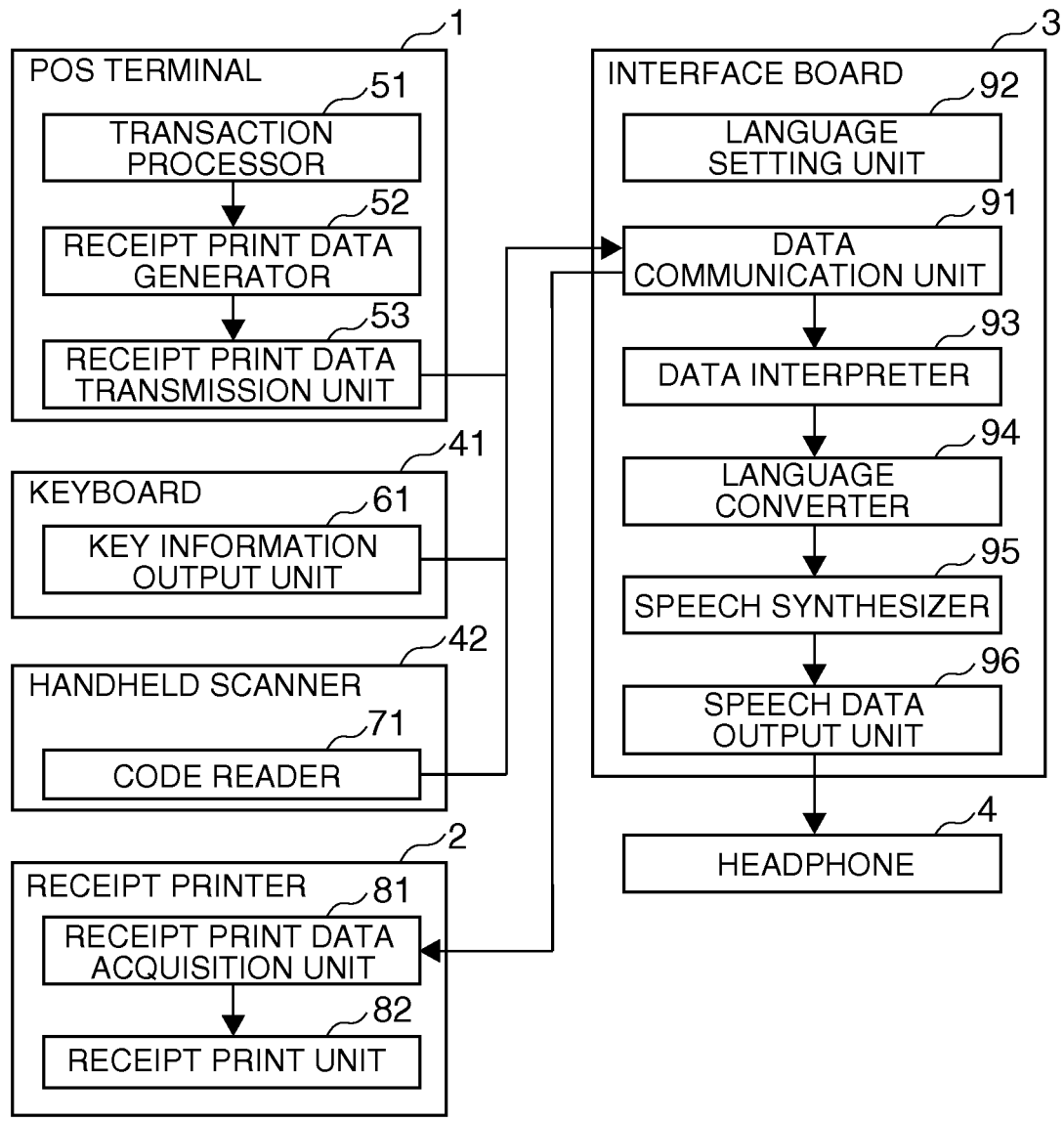
FIG. 6 is a function block diagram of an employee support system according to the second embodiment of the invention.
Figure 7:
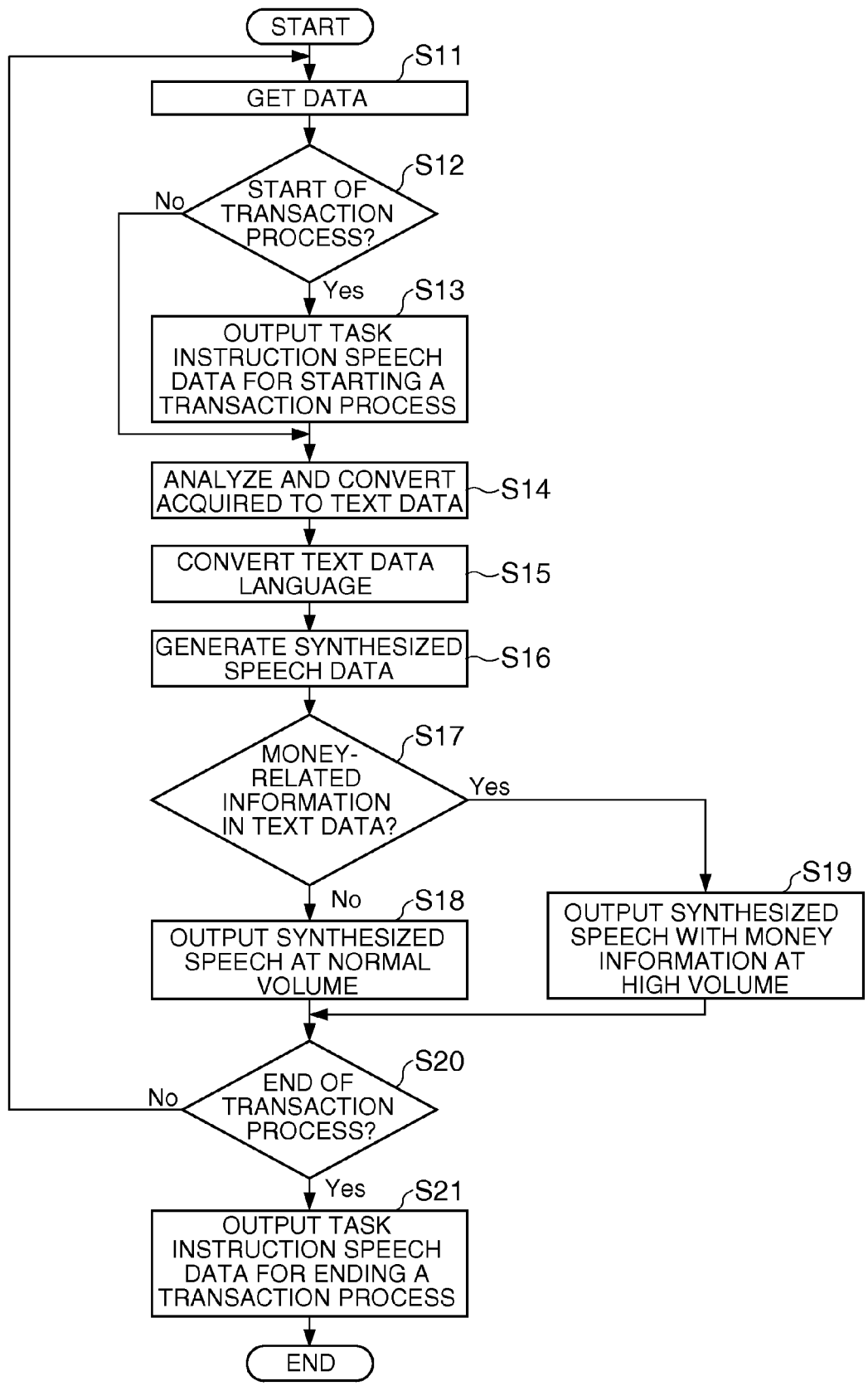
FIG. 7 is a flow chart of the speech output process of the employee support system according to the second embodiment of the invention.

A second embodiment of the invention is described next with reference to FIG. 5 to FIG. 7. Synthesized speech data is output from the interface board 103 installed to the kitchen printer 102 in the first embodiment described above. This embodiment differs in that the synthesized speech data is output from an interface board 3 installed in a receipt printer 2. Only the differences between this and the first embodiment are described below. Like parts in this and the first embodiment are identified by life reference numerals, and further description thereof is omitted. In addition, variations applicable to like parts in the first embodiment can be similarly applied to this embodiment.

Figure 5:
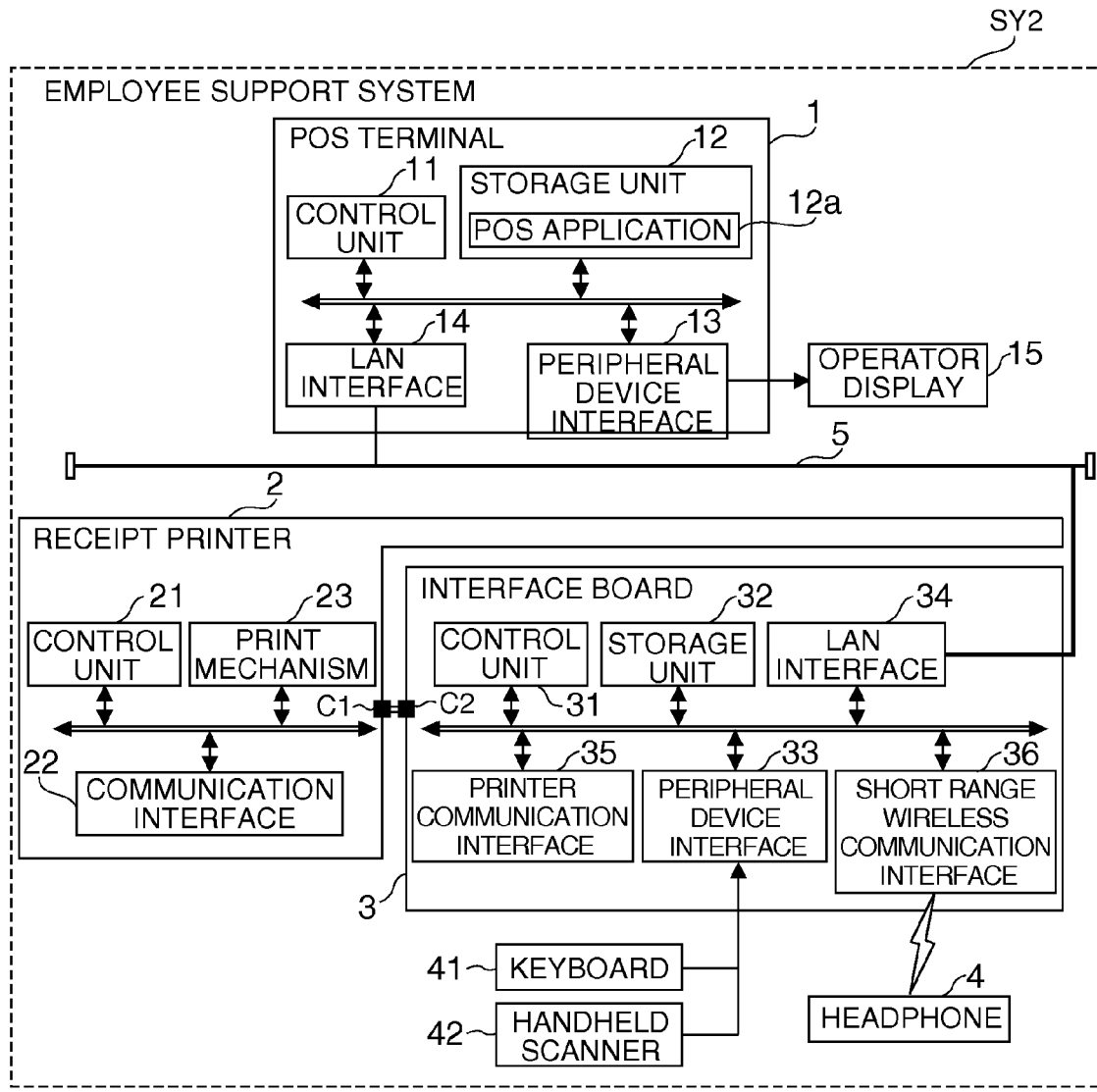
FIG. 5 is a control block diagram of an employee support system according to a second embodiment of the invention.

FIG. 5 is a control block diagram showing the configuration of an employee support system SY2 according to this embodiment of the invention. This embodiment of the invention describes an employee support system SY2 that supports cash register operations by foreign operators (simply "operators" below) in supermarkets and other retail stores.

As shown in the figure, the employee support system SY2 includes a POS terminal 1 that runs a transaction process, a receipt printer 2 that issues sales receipts, an interface board 3 (interface board, speech output device) that can be removably installed to the receipt printer 2, and a headphone 4 (external output device) that is worn by each operator.

The receipt printer 2 and interface board 3 are connected through connectors C1 and C2. The POS terminal 1 and interface board 3 are communicably connected through a LAN 5. The headphone 4 communicates with the interface board 3 using short range wireless communication.

The control configuration of the POS terminal 1 is identical to that in the first embodiment, and further description thereof is omitted. In this embodiment of the invention, however, the keyboard 41 or handheld scanner 42 (code reader) is connected to the interface board 3.

The receipt printer 2 has a communication interface 22, a print mechanism 23, and a control unit 21 that is connected to these and controls receipt printer 2 operation, and is configured substantially identically to the kitchen printer 102 in the first embodiment. The receipt printer 2 acquires receipt print data from the POS terminal 1 through the interface board 3, and prints sales receipts.

The interface board 3 includes a storage unit 32, peripheral device interface 33, LAN interface 34, printer communication interface 35, short range wireless communication interface 36, and control unit 31 that is connected to these other interfaces and controls the interface board 3.

The storage unit 32 stores language conversion dictionary data, and speech synthesis dictionary data, and task instruction speech data. The task instruction speech data is speech data for outputting spoken task instructions to operators during transaction processes. The task instruction speech data contains instructions for various POS terminal tasks in different languages.

The peripheral device interface 33 is for connecting input devices (POS peripherals) such as a keyboard 41 and handheld scanner 42. Product code information, key operation information, and other input data is acquired from these input devices.

The LAN interface 34 is used for communication between the POS terminal 1 and POS server, for example, over the LAN 5. The control unit 31 sends input data from the input devices to the POS terminal 1, and receives receipt print data for the input data from the POS terminal 1, through the LAN interface 34. The control unit 31 acquires information such as product names and prices for the products in the input data (such as code information) based on a product code master stored in the POS server, for example.

The printer communication interface 35 handles communications with the receipt printer 2 connected through connectors C1 and C2. The control unit 31 sends the receipt print data received from the POS terminal 1 to the receipt printer 2 through the printer communication interface 35. The short range wireless communication interface 36 handles short range wireless communication with the headphone 4. The control unit 31 outputs speech data to the headphone 4 through the short range wireless communication interface 36.

The functional configuration of the employee support system SY2 is described next with reference to FIG. 6.

The main functional components of the POS terminal 1 include a transaction processor 51, receipt print data generator 52, and receipt print data transmission unit 53. The transaction processor 51 runs a transaction process based on input data from the input devices (keyboard 41 and handheld scanner 42). The receipt print data generator 52 generates receipt print data based on the result of the transaction process. The receipt print data transmission unit 53 sends the resulting receipt print data to the interface board 3.

The main functional component of the keyboard 41 is a key information output unit 61. The key information output unit 61 outputs key operation information generated when the user operates a key, such as a product key or an exception key (cancel key), to the interface board 3.

The main functional component of the handheld scanner 42 is a code reader 71. The code reader 71 reads product codes from encoded images such as product barcodes used to identify ordered products, and outputs the captured result to the interface board 3.

The main functional components of the receipt printer 2 include a receipt print data acquisition unit 81 and receipt print unit 82. The receipt print data acquisition unit 81 acquires receipt print data generated by the POS terminal 1 through the interface board 3. The receipt print unit 82 prints a receipt based on the acquired receipt print data.

The main functional components of the interface board 3 include a data communication unit 91 (data acquisition unit), language setting unit 92, data interpreter 93 (base language conversion unit), language converter 94, speech synthesizer 95, and speech data output unit 96.

The data communication unit 91 receives receipt print data sent from the POS terminal 1, and input data (product codes and key operation signals) from the keyboard 41 and handheld scanner 42, sends the received receipt print data to the receipt printer 2. This data communication unit 91 is a main component of the peripheral device interface 33, LAN interface 34 and printer communication interface 35.

The language setting unit 92 sets the language converted by the language converter 94. The language is set using a keyboard 41 operation by the operator running the transaction process, and is set to the operator's native language, for example. If a keyboard is connected to the POS terminal 1, the operator could input the desired language using the keyboard (similarly to entering an order for the language), and this data could be sent to the receipt printer 2 to set the language.

The data interpreter 93 interprets the receipt print data and input data received by the data communication unit 91, extracts the product name part, quantity part, price part, and process content parts (such as cancel or total) contained in the receipt print data and input data, and converts these values to text data. The data interpreter 93 preferably extracts only information that can only be extracted when the transaction process is completed, such as the total amount, amount received, and change due, as the information extracted by analyzing the receipt print data, and extracts other information (such as the product name, quantity, and price of individual products) by analyzing the input data as the data is received.

The language converter 94 converts the text data output from the data interpreter 93 to the language set by the language setting unit 92 based on the language conversion dictionary data. The speech synthesizer 95 then generates synthesized speech data for the text data output from the language converter 94 based on the speech synthesis dictionary data.

The speech data output unit 96 outputs the synthesized speech data by short range wireless communication to the headphone 4. If price information is included in part of the text data output as synthesized speech, the synthesized speech data is output with the volume of the price information emphasized (increased). At specified times (such as the beginning and end of a transaction process), task instruction speech data for preset phrases appropriate to those times is also output to the headphone 4.

The speech output process of the employee support system SY2 (interface board 3) according to this embodiment of the invention is described next with reference to the flow chart in FIG. 7. In this example, a language that is understood by the operator is preset in the interface board 3 by the operator running the transaction process.

When data is acquired from the POS terminal 1, keyboard 41, or handheld scanner 42 (S11), the interface board 3 determines if the acquired data indicates the start of a transaction process (such as the first product code read after a previous transaction process ended). If the acquired data indicates the start of a transaction process (S12 returns Yes), the interface board 3 outputs from the task instruction speech data for the set language speech data telling the employee what to do at the beginning of the transaction process (such as speech data saying "does the customer have a member's card?") in the language that can be understood by the operator, by the customer, or by both sequentially, to the headphone 4 worn by the operator (S13). If there is no data indicating the start of a transaction process (S12 returns No), step S13 is skipped and control goes to the next step.

The interface board 3 then analyzes the acquired data, and converts the product name part, quantity part, price part, and process type part contained in the interpreted data to text data (S14). The converted text data is then converted to expressions in the set language (S15). The interface board 3 then generates synthesized speech data for the text data in the converted language (S16).

The interface board 3 then determines if monetary information such as the total amount, amount received, or the change due, is contained in the text data converted to synthesized speech. If such information is contained (S17 returns No), the synthesized speech data is output to the headphone 4 at a preset volume (normal volume) (S18). If such amount information is contained (S17 returns Yes), the interface board 3 outputs synthesized speech data to the headphone 4 with the volume of the monetary information increased from the normal volume for emphasis (S19).

The interface board 3 then determines if the transaction process was completed. This is determined by determining if receipt print data was received, or if a total key was pressed, for example. If the transaction process has not ended (S20 returns No), the interface board 3 repeats the process from step S11. If the transaction process ended (S20 returns Yes), the interface board 3 outputs speech data containing an employee instruction for the end of the transaction process (such as synthesized speech saying "is a shopping bag needed") from the task instruction speech data in the set language to the headphone 4 (S21), and the process ends.

As described above, this embodiment of the invention converts information to be printed on a receipt (such as product names, quantities, prices, and process type (cancel or total, for example)) to the language set by the operator, and outputs the information in the converted language as speech. More specifically, when the operator of the cash register is a foreigner, the information to be printed on the receipt is converted to the native language of the operator (that is, a language that is understood by the operator), and output as speech to the headphone 4 worn by the operator.

As a result, foreign operators can hear and get the content in their own language, more easily recognize operating errors or mistakes in the total amount, for example, and thereby take appropriate measures to correct the mistake. Fatal errors such as a foreign operator completing a transaction without noticing a mistake in the transaction process can therefore be prevented, and the accuracy of transactions processed by foreign operators can therefore be improved.

This embodiment of the invention also outputs operator instructions as speech in a language understood by the operator at specific times in a transaction process, and thereby enables transaction processes to proceed smoothly.

Furthermore, when the language understood by the customer and the language understood by the operator are different, this embodiment of the invention outputs an explanation for the customer in the language understood by the customer to the operator's headphone 4 so that the operator can repeat the information in a way that is easy for the customer to understand.

Furthermore, by increasing the volume and emphasizing cost-related information printed on the receipt (such as the sale total, amount received, and change due) in the speech output to the headphone 4, this embodiment of the invention prompts the operator to may particular attention to money amounts and thereby reduce mistakes giving change.

Furthermore, because synthesized speech data is generated and output using receipt print data output from the POS terminal 1 and input data from POS peripherals (keyboard 41 and handheld scanner 42), this embodiment of the invention does not require changes to the POS terminal 1 or POS peripherals.

In the second embodiment of the invention the speech data output unit 96 outputs speech data for tasks to be performed at the beginning and end of the transaction process, but when information identifying the payment method is contained in the receipt print data (output from the POS terminal 1), speech data for task instructions appropriate to the payment method may also be output. This configuration requires that task instruction speech data for the payment methods is also stored for each of the available languages. More specifically, the speech data output unit 96 outputs task instruction speech data corresponding to the payment method and set language to the headphone 4.

When payment is by credit card, this task instruction speech data may include a prompt to ask whether the amount is to be divided into multiple payments, and if payment is by cash, may include a prompt to provide change using the large bills possible. This configuration can reduce operator errors by outputting speech data for the task instructions appropriate to the payment method in the selected language to the external output device used by the operator.

The foregoing second embodiment of the invention is described using one headphone 4, but may be configured with plural headphones 4 as described in the first embodiment. In this case a language table 46 (see FIG. 3A) is referenced in steps S13, S18, and S21 in the flow chart in FIG. 7 to output add the identification address of the selected language to the output synthesized speech. In addition, as shown in FIG. 3B, synthesized speech data may be output through each of the language-specific channels (ports).

An operator display 15 is connected to the POS terminal 1 in the second embodiment described above, but may be connected to the peripheral device interface 33 of the interface board 3. In this configuration the POS terminal 1 may function as the POS server.

Data to be printed on a receipt (order print data or receipt print data) is acquired from the POS terminal 1, the language converted, and speech data is output in the two embodiments described above, but the speech data may be output when a special speech command is received from the POS terminal 1. More specifically, in addition to information printed on the receipt, the print data may also include other data such as a speech command.

The two embodiments described above are configured with the interface board 3 or 103 installed in the receipt printer 2 or kitchen printer 102, but the invention is not so limited and the printer 2, 102 and interface board 3, 103 may be rendered in unison.

It will be obvious to one with ordinary skill in the related art that the invention is not limited to the foregoing embodiments, and can be modified in many ways without departing from the scope of the accompanying claims. For example, the first and second embodiments described above may be combined to render an employee support system SY that supports both kitchen workers and cash register operators.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A speech output device comprising:
a plurality of portable speakers;
an interface board including a memory that stores a language table that identifies which language is used with each of the plurality of portable speakers;
the interface board being configured to
acquire print data for printing a ticket or a receipt;
convert part of the print data to first text data in a first language,
convert the first text data in the first language to second text data in two or more second languages in accordance with the language table,
generate speech data in the two or more second languages based on the language table, and
output the speech data to two or more of the plurality of portable speakers in the respective identified language(s) based on the generated speech data, the generated speech data pertaining to customer preferences being output at a higher volume than speech data corresponding to product name; and
a print mechanism configured to print the ticket or the receipt based on the print data.

2. A POS system comprising:
a POS terminal configured to output print data for printing a ticket or a receipt;
a plurality of portable speakers;
an interface board including a memory that stores a language table that identifies which language is used with each of the plurality of portable speakers;
the interface board being configured to
acquire the print data outputted by the POS terminal,
convert part of the print data to first text data in a first language,
convert the first text data in the first language to second text data in two or more second languages in accordance with the language table,
generate speech data in the two or more second languages based on the language table,
output the speech data to two or more of the plurality of portable speakers in the respective identified language(s) based on the generated speech data, the generated speech data pertaining to customer preferences being output at a higher volume than speech data corresponding to product name, and
output the print data; and
a printer configured to print the ticket or the receipt based on the print data.

3. The POS system described in claim 2, further comprising:
a code reader connected to the POS terminal and configured to read encoded information;
wherein the print data includes output from the code reader.

4. An interface board comprising:
a plurality of portable speakers;
a first interface including a memory that stores a language table that identifies which language is used with each of the plurality of portable speakers, the first interface being configured to acquire print data for printing a ticket or a receipt;
a controller configured to
convert part of the print data to first text data in a first language,
convert the first text data in the first language to second text data in two or more second languages in accordance with the language table, and
generate speech data in the two or more second languages based on the language table;
a second interface configured to output the speech data to two or more of the plurality of portable speakers in the respective identified language(s) based on the generated speech data, the generated speech data pertaining to customer preferences being output at a higher volume than speech data corresponding to product name; and
a third interface configured to output the print data.

5. A control method for a POS system, comprising:
storing a language table that identifies which language is used with each of a plurality of portable speakers;
receiving, by an interface board, print data for printing a ticket or a receipt generated by a POS terminal;
converting, by the interface board, part of the print data to first text data in a first language;
converting, by the interface board, the first text data in the first language to second text data in two or more second languages in accordance with the language table;
generating, by the interface board, speech data in the two or more second languages based on the language table; and
outputting, by the interface board, the speech data to two or more of the plurality of portable speakers in the respective identified language(s) based on the generated speech data, the generated speech data pertaining to customer preferences being output at a higher volume than speech data corresponding to product name, and
outputting the print data to a printer.

* * * * *